(12) United States Patent
Hunsaker (10) Patent No.: US 8,839,981 B2
(45) Date of Patent: Sep. 23, 2014

(54) EGG CARTON WITH AN EGG-OPENING APPARATUS

(71) Applicant: Nathan Hunsaker, Gilbert, AZ (US)

(72) Inventor: Nathan Hunsaker, Gilbert, AZ (US)

( * ) Notice: Subject to any disclaimer, the term of this patent is extended or adjusted under 35 U.S.C. 154(b) by 0 days.

(21) Appl. No.: 13/895,459

(22) Filed: May 16, 2013

(65) Prior Publication Data
US 2013/0306641 A1 Nov. 21, 2013

Related U.S. Application Data

(60) Provisional application No. 61/649,005, filed on May 18, 2012.

(51) Int. Cl.
B65D 1/36 (2006.01)
B65D 25/20 (2006.01)
B65D 85/32 (2006.01)

(52) U.S. Cl.
CPC *B65D 1/36* (2013.01); *B65D 85/32* (2013.01); *B65D 25/205* (2013.01)
USPC .......................................... 220/508; 225/49

(58) Field of Classification Search
CPC .. B65D 85/328; B65D 85/324; B65D 85/322; B65D 85/321; B65D 85/32; B65D 85/325; B65D 25/205; B65D 1/36
USPC .......................... 220/508, 507, 735, 694, 890; 206/521.15, 521.1; 426/112, 115, 119, 426/298, 299; 225/49, 48, 42, 39; 83/946; 99/509
See application file for complete search history.

(56) References Cited

U.S. PATENT DOCUMENTS

| | | | | |
|---|---|---|---|---|
| 1,473,383 A * | 11/1923 | Riker | ............................... | 99/509 |
| 1,929,945 A * | 10/1933 | Chaplin et al. | ............... | 217/26.5 |
| 3,746,241 A * | 7/1973 | Seymour | ..................... | 206/521.1 |
| 3,908,891 A * | 9/1975 | Jackson | .................... | 206/521.15 |
| 4,087,040 A * | 5/1978 | Bessett et al. | ............... | 206/521.1 |
| 4,609,141 A * | 9/1986 | Lake | .......................... | 206/521.1 |

* cited by examiner

Primary Examiner — Robert J Hicks
(74) Attorney, Agent, or Firm — Griffiths & Seaton PLLC (57) ABSTRACT

Egg cartons comprising an egg-opening apparatus coupled to the egg carton are provided. The egg-opening apparatus includes any shape and/or form that is capable of opening and/or cracking an egg when the egg is struck on the egg-opening apparatus. Furthermore, the egg-opening apparatus includes any material having a hardness that is capable of opening and/or cracking an egg when the egg is struck on the egg-opening apparatus.

8 Claims, 6 Drawing Sheets

EGG CARTON WITH AN EGG-OPENING APPARATUS

REFERENCE TO RELATED APPLICATION

The present invention claims priority to U.S. Provisional Patent Application No. 61/649,005 filed on May 18, 2012, the contents of which are incorporated herein by reference.

BACKGROUND OF THE INVENTION

1. Field of the Invention

The present invention relates in general to egg cartons, and particularly to egg cartons with an egg-opening apparatus.

2. Description of the Related Art

Eggs are typically stored for purchase in an egg carton including a dozen or more eggs. Each egg carton includes a number of depressions for holding the eggs so that the eggs are protected during storage and transport. When an individual desires to use and/or consume the egg, the egg is removed from the egg carton and the shell is opened to remove the contents therein. To access the contents (i.e., the yolk, egg white, etc.) of the eggshell, an individual "cracks" the eggshell on, for example, a pan, a bowl, an edge of a counter, or other similar surface that is external to the egg carton in which the eggs are stored. That is, the individual must use a surface external to the egg carton to open the egg because prior egg cartons do not include an apparatus for opening an egg. Furthermore, prior egg cartons are typically formed from a light material (e.g., polystyrene foam) that does not include a hardness or firmness capable of cracking the egg thereon when struck on the egg carton.

SUMMARY OF THE INVENTION

Various embodiments provide an egg carton comprising an egg-opening apparatus coupled to the egg carton. The egg-opening apparatus comprises any shape and/or form that is capable of opening and/or cracking an egg when the egg is struck on the egg-opening apparatus. Furthermore, the egg-opening apparatus is comprised of any material including a hardness that is capable of opening and/or cracking an egg when the egg is struck on the egg-opening apparatus.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below include egg cartons comprising an egg-opening apparatus. Though the embodiments show various features of the egg carton, the invention is not limited to the embodiments shown in the figures.

Figure 1:
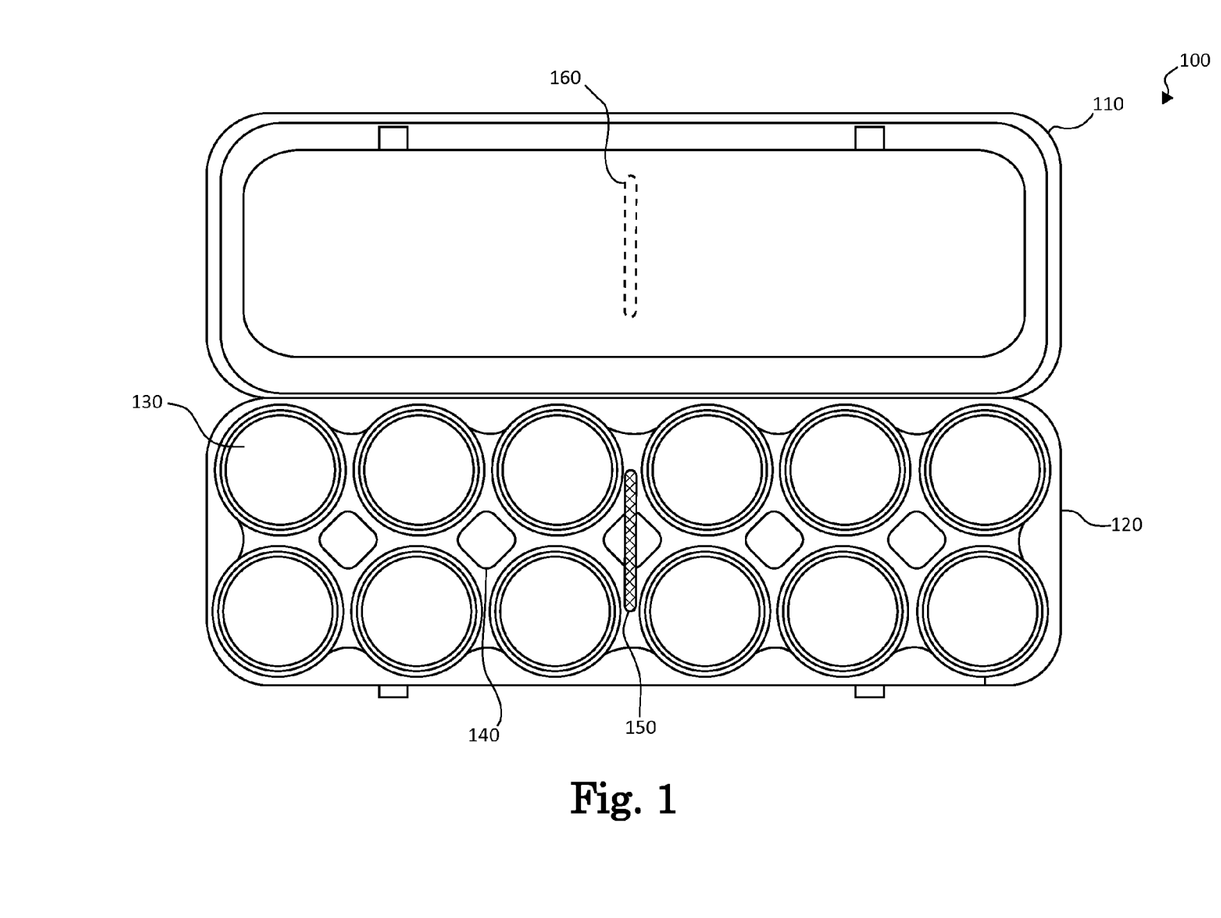
FIG. 1 is a diagram of a top view of one embodiment of an egg carton comprising an egg-opening apparatus.

Turning now to FIG. 1, FIG. 1 is a diagram of an egg carton 100 in accordance with one embodiment of the invention. Egg carton 100 includes a lid 110, a bottom 120, a plurality of depressions 130 for storing an egg, a plurality of protrusions 140 rising a level above the top of an egg stored in a depression 130, and a vertically oriented egg-opening apparatus 150.

Egg-opening apparatus 150 may be made out of any material that is hard enough to open and/or crack an egg when the egg is struck on egg-opening apparatus 150. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 150. In one embodiment, egg-opening apparatus 150 comprises a ridge, edge, and/or a point comprising a surface area sufficient to open and/or crack an egg being struck on egg-opening apparatus 150. The ridge, edge, and/or point of egg-opening apparatus 150 may taper away from bottom 120 or may be a flat surface. Furthermore, the ridge, edge, and/or point in egg-opening apparatus 150 may be a sharp, semi-sharp, or a dull ridge, edge, and/or point that encourages cracking the egg open and discourages smashing the eggshell when struck on egg-opening apparatus 150. In addition, the width of the ridge and/or edge is sufficiently narrow to create a crack or opening in the egg as opposed to smashing the egg (e.g., discourages smashing the eggshell) when the egg is struck on egg-opening apparatus 150.

At least in the illustrated embodiment, egg-opening apparatus 150 is attached to bottom 120 and occupies a space between two or more of depressions 130. In addition, egg-opening apparatus 150 may comprise support to prevent or substantially prevent bottom 120 from breaking and/or deforming when an egg is struck on egg-opening apparatus 150 and/or prevent or substantially prevent egg-opening apparatus 150 from moving when an egg is struck on egg-opening apparatus 150. Furthermore, egg-opening apparatus 150 comprises a height that is equal to or greater than the height of eggs stored in depressions 130 and/or protrusions 140.

In one embodiment in which egg-opening apparatus 150 comprises a height greater than the height of protrusions 140, lid 110 comprises a slot 160 to house egg-opening apparatus 150 when lid 110 is closed. In one embodiment, slot 160 is an aperture comprising dimensions (e.g., size, shape, etc.) sufficient to house egg-opening apparatus 150. In another embodiment, slot 160 is a depression in lid 110 comprising dimensions (e.g., size, shape, etc.) sufficient to house egg-opening apparatus 150.

Although the illustrated of embodiment of egg carton 100 shows egg-opening apparatus 150 oriented in the middle of bottom 120, egg carton 100 is not limited to this embodiment. That is, various other embodiments of egg carton 100 include egg-opening apparatus biased to one or more sides (e.g., a length and/or width) of bottom 120.

Figure 2:
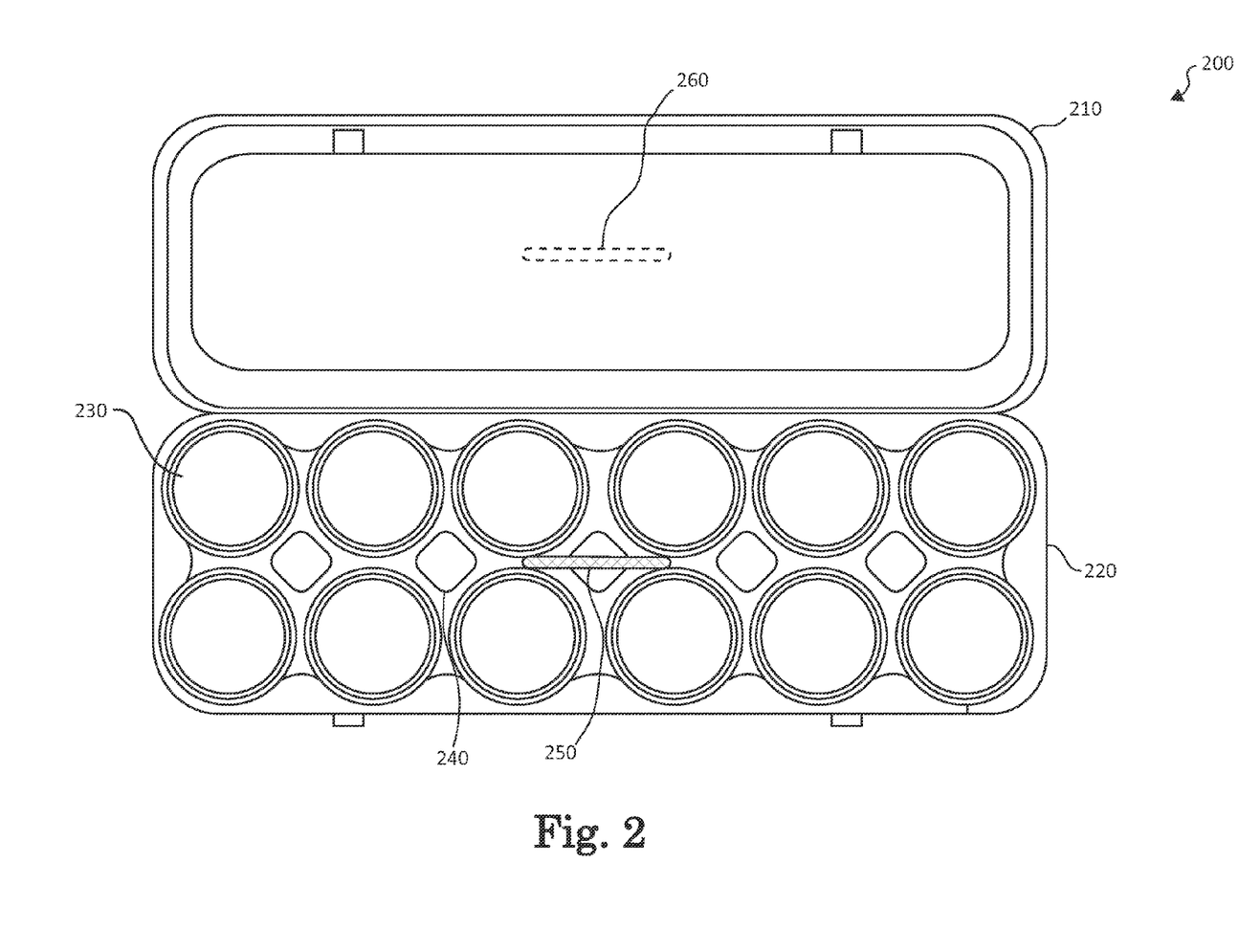
FIG. 2 is a diagram of another embodiment of an egg carton comprising an egg-opening apparatus.

With reference to FIG. 2, FIG. 2 is a diagram of an egg carton 200 in accordance with one embodiment of the invention. Egg carton 200 includes a lid 210, a bottom 220, a plurality of depressions 230 for storing an egg, a plurality of protrusions 240 rising a level above the top of an egg stored in a depression 230, and a horizontally oriented egg-opening apparatus 250.

Egg-opening apparatus 250 may be made out of any material that is hard enough to open and/or crack an egg when the egg is struck on egg-opening apparatus 250. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 250. In one embodiment, egg-opening apparatus 250 comprises a ridge, edge, and/or a point comprising a surface area sufficient to open and/or crack an egg being struck on egg-opening apparatus 250. The ridge, edge, and/or point of egg-opening apparatus 250 may taper away from bottom 220 or may be a flat surface. Furthermore, the ridge, edge, and/or point in egg-opening apparatus 250 may be a sharp, semi-sharp, or a dull ridge, edge, and/or point that encourages cracking the egg open and discourages smashing the eggshell when struck on egg-opening apparatus 250. In addition, the width of the ridge and/or edge is sufficiently narrow to create a crack or opening in the egg as opposed to smashing the egg (e.g., discourages smashing the eggshell) when the egg is struck on egg-opening apparatus 250.

At least in the illustrated embodiment, egg-opening apparatus 250 is attached to bottom 220 and occupies a space between two or more of depressions 230. In addition, egg-opening apparatus 250 may comprise support to prevent or substantially prevent bottom 220 from breaking and/or deforming when an egg is struck on egg-opening apparatus 250 and/or prevent or substantially prevent egg-opening apparatus 250 from moving when an egg is struck on egg-opening apparatus 250. Furthermore, egg-opening apparatus 250 comprises a height that is equal to or greater than the height of eggs stored in depressions 230 and/or protrusions 240.

In one embodiment in which egg-opening apparatus 250 comprises a height greater than the height of protrusions 240, lid 210 comprises a slot 260 to house egg-opening apparatus 250 when lid 210 is closed. In one embodiment, slot 260 is an aperture comprising dimensions (e.g., size, shape, etc.) sufficient to house egg-opening apparatus 250. In another embodiment, slot 260 is a depression in lid 210 comprising dimensions (e.g., size, shape, etc.) sufficient to house egg-opening apparatus 250.

Although the illustrated of embodiment of egg carton 200 shows egg-opening apparatus 250 oriented in the middle of bottom 220, egg carton 200 is not limited to this embodiment. That is, various other embodiments of egg carton 200 include egg-opening apparatus biased to one or more sides (e.g., a length and/or width) of bottom 220.

Figure 3:
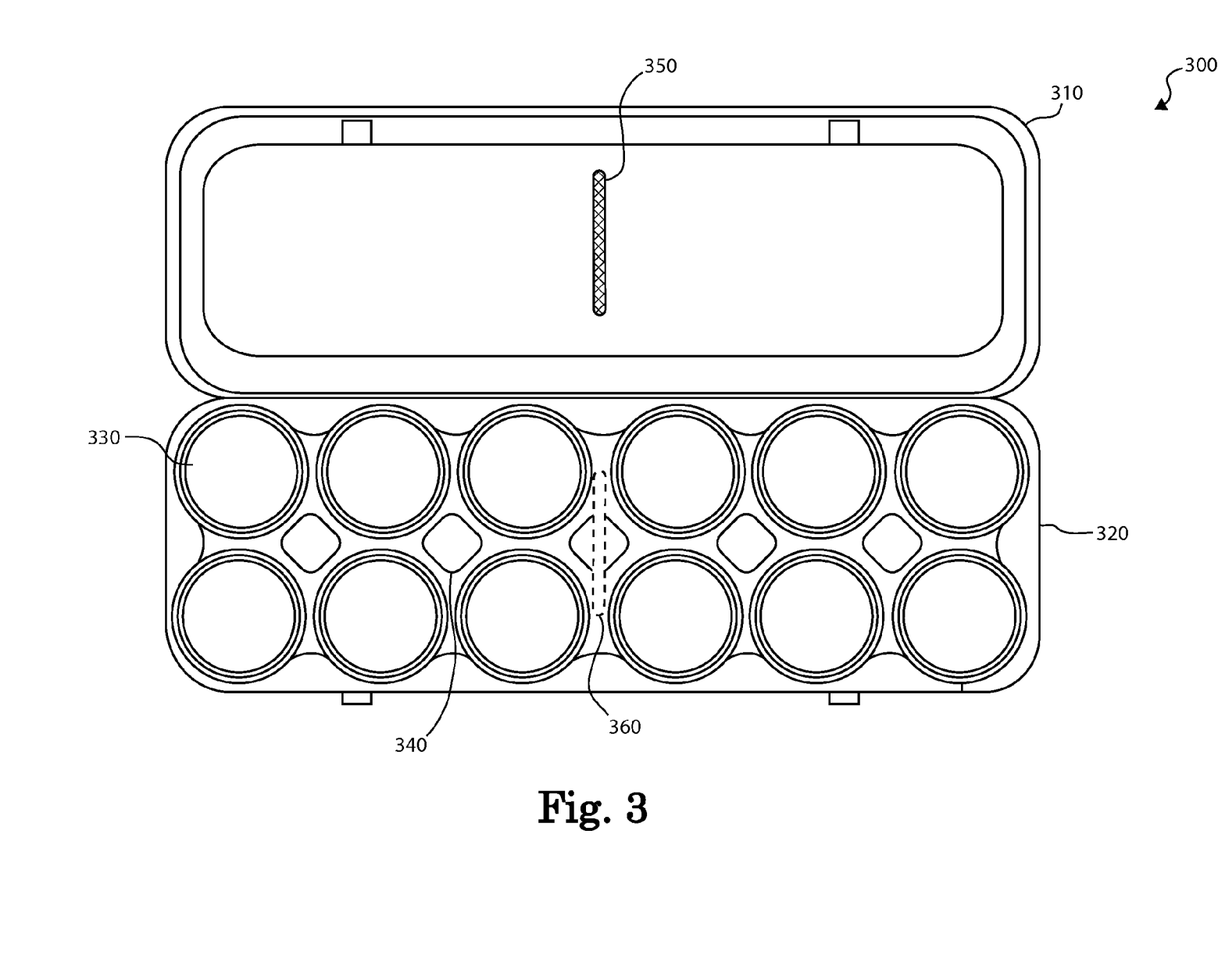
FIG. 3 is a diagram of yet another embodiment of an egg carton comprising an egg-opening apparatus.

With reference to FIG. 3, FIG. 3 is a diagram of an egg carton 300 in accordance with one embodiment of the invention. Egg carton 300 includes a lid 310, a bottom 320, a plurality of depressions 330 for storing an egg, a plurality of protrusions 340 rising a level above the top of an egg stored in a depression 330, and a vertically oriented egg-opening apparatus 350.

Egg-opening apparatus 350 may be made out of any material that is hard enough to open and/or crack an egg when the egg is struck on egg-opening apparatus 350. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 350. In one embodiment, egg-opening apparatus 350 comprises a ridge, edge, and/or a point comprising a surface area sufficient to open and/or crack an egg being struck on egg-opening apparatus 350. The ridge, edge, and/or point of egg-opening apparatus 350 may taper away from lid or may be a flat surface. Furthermore, the ridge, edge, and/or point in egg-opening apparatus 350 may be a sharp, semi-sharp, or a dull ridge, edge, and/or point. In addition, the width of the ridge and/or edge is sufficiently narrow to create a crack or opening in the egg as opposed to smashing the egg when the egg is struck on egg-opening apparatus 350.

At least in the illustrated embodiment, egg-opening apparatus 350 is attached to lid 210 and occupies a space between two or more of depressions 330 when lid 310 is closed. In addition, egg-opening apparatus 350 may comprise support to prevent or substantially prevent lid 210 from breaking and/or deforming when an egg is struck on egg-opening apparatus 350 and/or prevent or substantially prevent egg-opening apparatus 350 from moving when an egg is struck on egg-opening apparatus 350.

In one embodiment, bottom 320 comprises a slot 360 to house egg-opening apparatus 350 when lid 310 is closed. In one embodiment, slot 360 is an aperture comprising dimensions (e.g., size, shape, etc.) sufficient to house egg-opening apparatus 350. In another embodiment, slot 360 is a depression in bottom 320 comprising dimensions (e.g., size, shape, etc.) sufficient to house egg-opening apparatus 350.

Although the illustrated of embodiment of egg carton 300 shows egg-opening apparatus 350 oriented in the middle of lid 310, egg carton 300 is not limited to this embodiment. That is, various other embodiments of egg carton 300 include egg-opening apparatus biased to one or more sides (e.g., a length and/or width) of lid 320.

Figure 4:
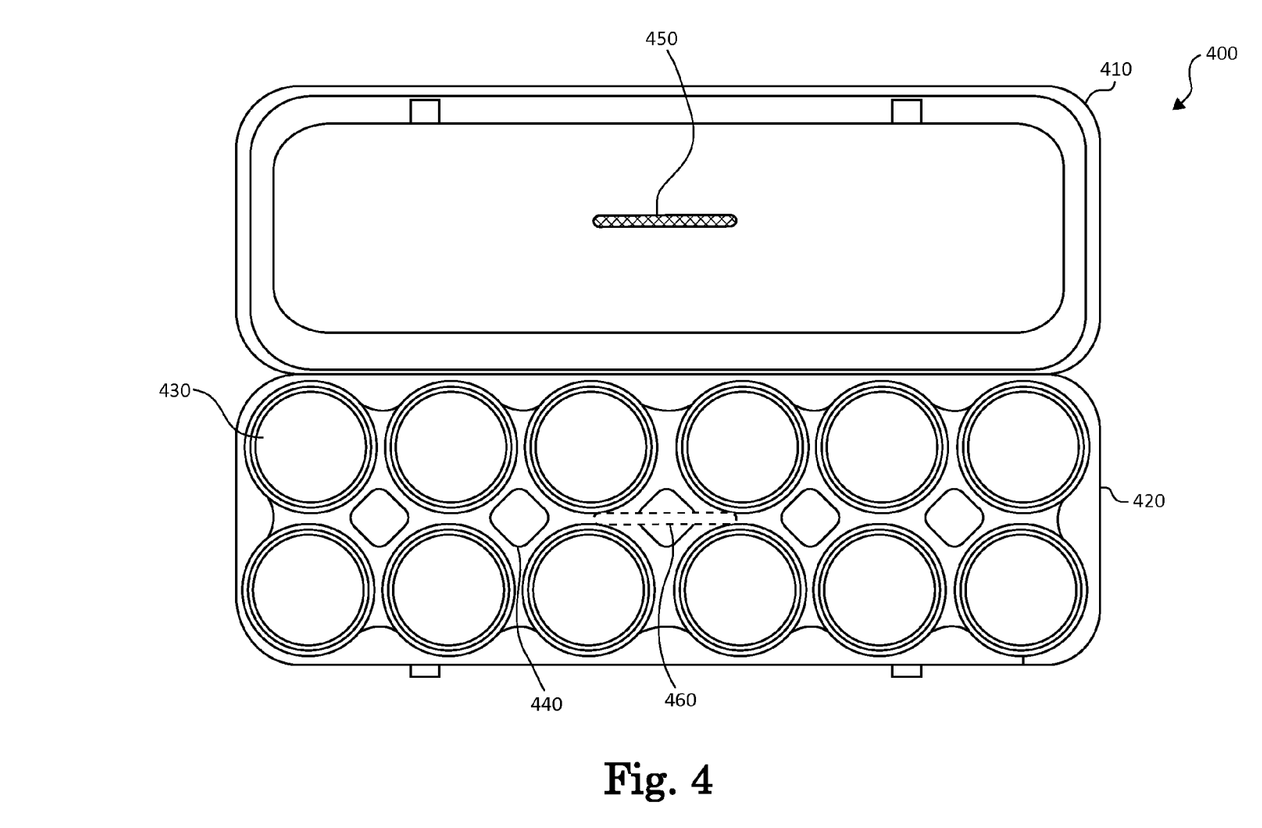
FIG. 4 is a diagram of still another embodiment of an egg carton comprising an egg-opening apparatus.

Referring now to FIG. 4, FIG. 4 is a diagram of an egg carton 400 in accordance with one embodiment of the invention. Egg carton 400 includes a lid 410, a bottom 420, a plurality of depressions 430 for storing an egg, a plurality of protrusions 440 rising a level above the top of an egg stored in a depression 430, and a horizontally oriented egg-opening apparatus 450.

Egg-opening apparatus 450 may be made out of any material that is hard enough to open and/or crack an egg when the egg is struck on egg-opening apparatus 450. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 450. In one embodiment, egg-opening apparatus 450 comprises a ridge, edge, and/or a point comprising a surface area sufficient to open and/or crack an egg being struck on egg-opening apparatus 450. The ridge, edge, and/or point of egg-opening apparatus 450 may taper away from lid or may be a flat surface. Furthermore, the ridge, edge, and/or point in egg-opening apparatus 450 may be a sharp, semi-sharp, or a dull ridge, edge, and/or point. In addition, the width of the ridge and/or edge is sufficiently narrow to create a crack or opening in the egg as opposed to smashing the egg when the egg is struck on egg-opening apparatus 450.

At least in the illustrated embodiment, egg-opening apparatus 450 is attached to lid 210 and occupies a space between two or more of depressions 430 when lid 210 is closed. In addition, egg-opening apparatus 450 may comprise support to prevent or substantially prevent lid 210 from breaking and/or deforming when an egg is struck on egg-opening apparatus 450 and/or prevent or substantially prevent egg-opening apparatus 450 from moving when an egg is struck on egg-opening apparatus 450.

In one embodiment, bottom 420 comprises a slot 460 to house egg-opening apparatus 450 when lid 410 is closed. In one embodiment, slot 460 is an aperture comprising dimensions (e.g., size, shape, etc.) sufficient to house egg-opening apparatus 450. In another embodiment, slot 460 is a depression in bottom 420 comprising dimensions (e.g., size, shape, etc.) sufficient to house egg-opening apparatus 450.

Although the illustrated of embodiment of egg carton 400 shows egg-opening apparatus 450 oriented in the middle of lid 410, egg carton 400 is not limited to this embodiment. That is, various other embodiments of egg carton 400 include egg-opening apparatus biased to one or more sides (e.g., a length and/or width) of lid 420.

Figure 5:
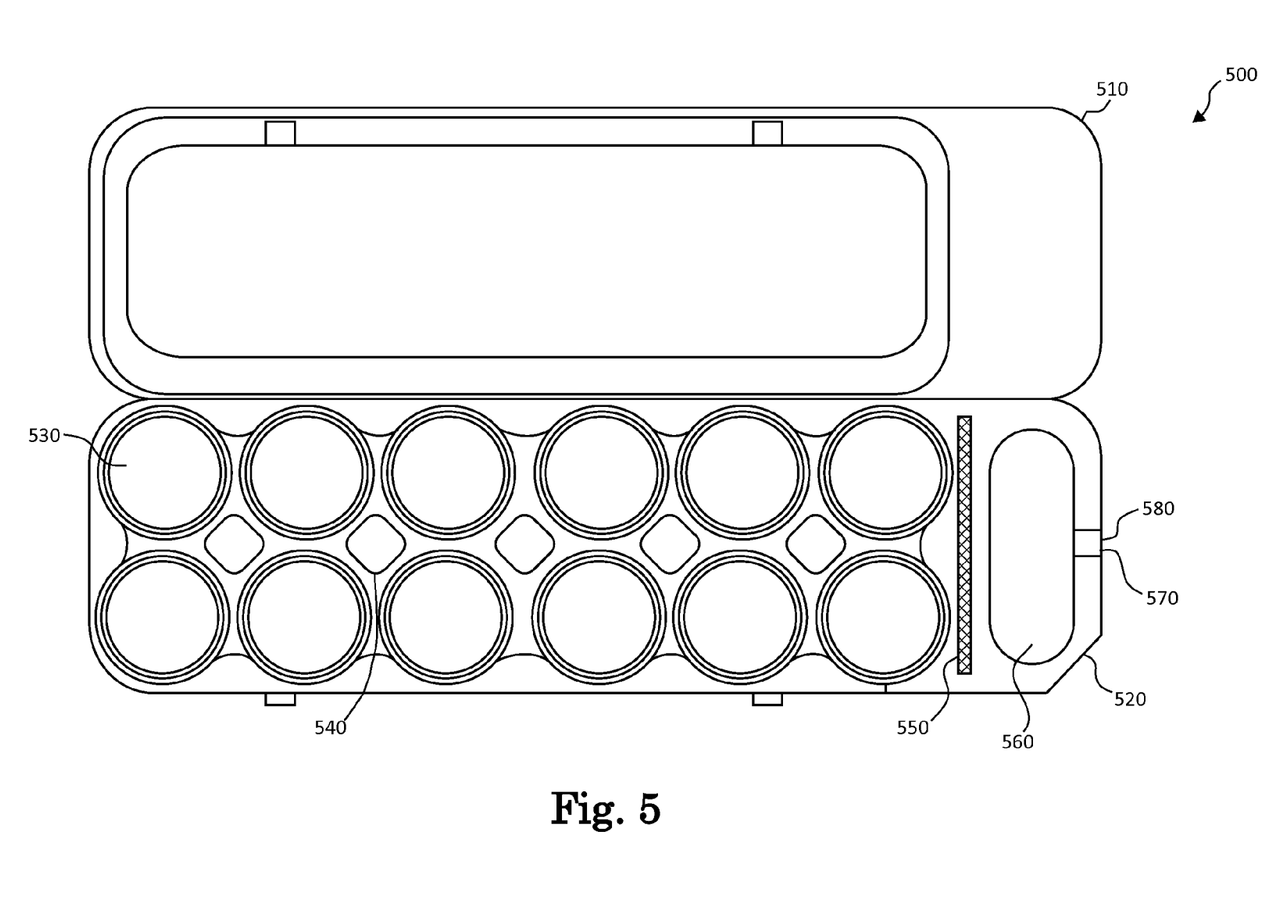
FIG. 5 is a diagram of an one embodiment of an egg carton comprising an egg-opening apparatus and a reservoir.

Turning now to FIG. 5, FIG. 5 is a diagram of an egg carton 500 in accordance with one embodiment of the invention. Egg carton 500 includes a lid 510, a bottom 520, a plurality of depressions 530 for storing an egg, a plurality of protrusions 540 rising a level above the top of an egg stored in a depression 530, a vertically oriented egg-opening apparatus 550, a reservoir 560, and a conduit 570.

Egg-opening apparatus 550 may be made out of any material that is hard enough to open and/or crack an egg when the egg is struck on egg-opening apparatus 550. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 550. In one embodiment, egg-opening apparatus 550 comprises a ridge, edge, and/or a point comprising a surface area sufficient to open and/or crack an egg being struck on egg-opening apparatus 550. The ridge, edge, and/or point of egg-opening apparatus 550 may taper away from bottom 520 or may be a flat surface. Furthermore, the ridge, edge, and/or point in egg-opening apparatus 550 may be a sharp, semi-sharp, or a dull ridge, edge, and/or point. In addition, the width of the ridge and/or edge is sufficiently narrow to create a crack or opening in the egg as opposed to smashing the egg when the egg is struck on egg-opening apparatus 550.

At least in the illustrated embodiment, egg-opening apparatus 550 is attached to bottom 520 and may comprise support to prevent or substantially prevent bottom 520 from breaking and/or deforming when an egg is struck on egg-opening apparatus 550. In addition, egg-opening apparatus 550 may comprise support to prevent or substantially prevent egg-opening apparatus 550 from moving when an egg is struck on egg-opening apparatus 550.

Reservoir 560 is located on bottom 520 may include any dimensions (e.g. length, width, and depth) and/or shape suitable for storing the contents (e.g., one or more eggs) after, for example, the egg(s) were opened/cracked utilizing egg-opening apparatus 550. As illustrated, reservoir 560 is in communication with a conduit 570.

Conduit 570 may include any size and/or shape that enable the contents of reservoir 560 to flow out of egg carton 500. To prevent the unwanted release of the contents in reservoir 560, conduit 570 may include a barrier 580.

Barrier 580 may be any system, device, and/or mechanism capable of selectively allowing and preventing the contents of reservoir 570 from exiting reservoir 560 via conduit 570 when barrier 580 is engaged. That is, when barrier 580 is engaged, the contents of reservoir 560 remain in reservoir 560. Alternatively, when barrier 580 is disengaged, the contents of reservoir 560 exit reservoir 560. Examples of barrier 580 include, but are not limited to, a plug, a cap, a flap, and the like barriers.

Figure 6:
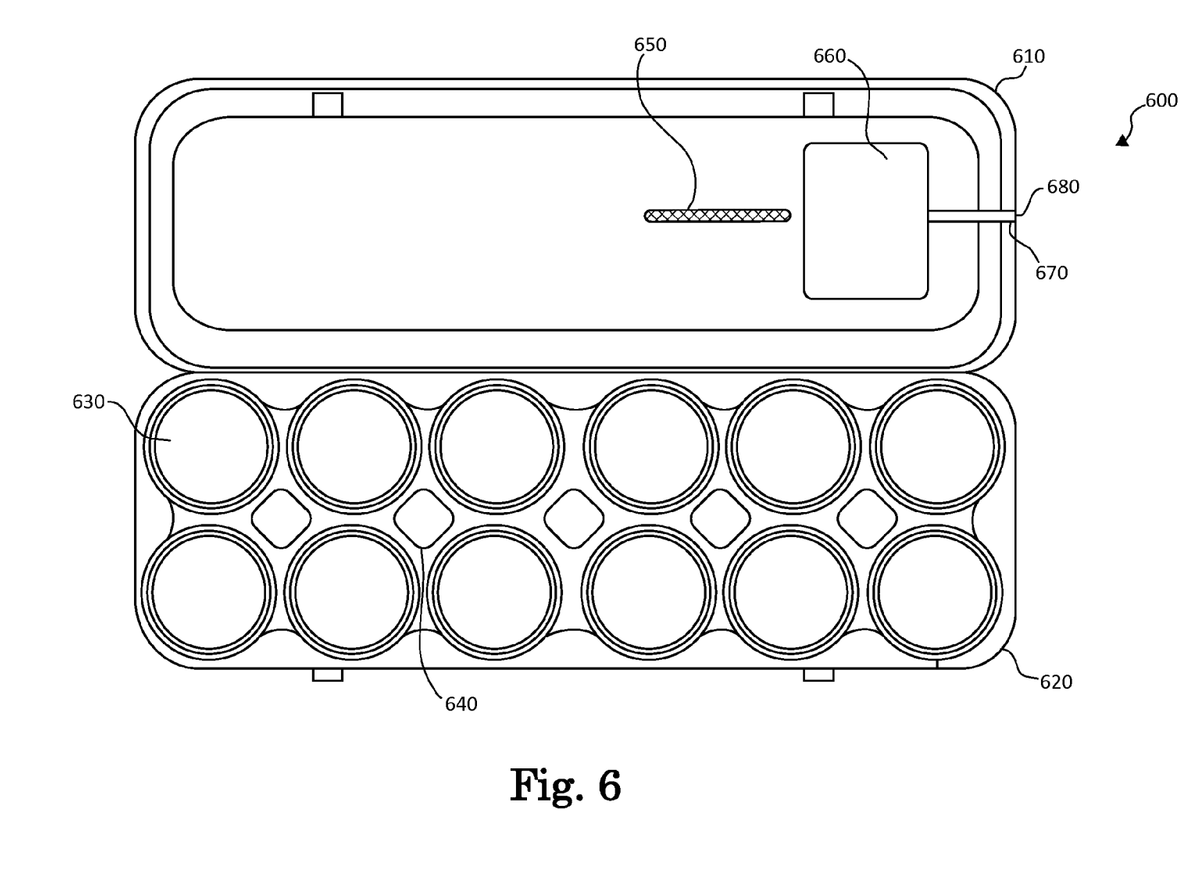
FIG. 6 is a diagram of another embodiment of an egg carton comprising an egg-opening apparatus and a reservoir.

Turning now to FIG. 6, FIG. 6 is a diagram of an egg carton 600 in accordance with one embodiment of the invention. Egg carton 600 includes a lid 610, a bottom 620, a plurality of depressions 630 for storing an egg, a plurality of protrusions 640 rising a level above the top of an egg stored in a depression 630, a vertically oriented egg-opening apparatus 650, a reservoir 660, and a conduit 670.

Egg-opening apparatus 650 may be made out of any material that is hard enough to open and/or crack an egg when the egg is struck on egg-opening apparatus 650. Examples of suitable materials include, but are not limited to, plastic, metal, cardboard, and the like sufficiently hard and/or firm materials.

In various embodiments, egg-opening apparatus may include any shape and/or form that opens and/or cracks an egg when the egg is struck on egg-opening apparatus 650. In one embodiment, egg-opening apparatus 650 comprises a ridge, edge, and/or a point comprising a surface area sufficient to open and/or crack an egg being struck on egg-opening apparatus 650. The ridge, edge, and/or point of egg-opening apparatus 650 may taper away from bottom 620 or may be a flat surface. Furthermore, the ridge, edge, and/or point in egg-opening apparatus 650 may be a sharp, semi-sharp, or a dull ridge, edge, and/or point. In addition, the width of the ridge and/or edge is sufficiently narrow to create a crack or opening in the egg as opposed to smashing the egg when the egg is struck on egg-opening apparatus 650.

At least in the illustrated embodiment, egg-opening apparatus 650 is attached to lid 610 and may comprise support to prevent or substantially prevent lid 610 from breaking and/or deforming when an egg is struck on egg-opening apparatus 650. In addition, egg-opening apparatus 650 may comprise support to prevent or substantially prevent egg-opening apparatus 650 from moving when an egg is struck on egg-opening apparatus 650.

Reservoir 660 is located on lid 610 and may include any dimensions (e.g. length, width, and depth) and/or shape suitable for storing the contents (e.g., one or more eggs) after, for example, the egg(s) were opened/cracked utilizing egg-opening apparatus 650. As illustrated, reservoir 660 is in communication with a conduit 670.

Conduit 670 may include any size and/or shape that enable the contents of reservoir 660 to flow out of egg carton 600. To prevent the unwanted release of the contents in reservoir 660, conduit 670 may include a barrier 680.

Barrier 680 may be any system, device, and/or mechanism capable of selectively allowing and preventing the contents of reservoir 670 from exiting reservoir 660 via conduit 670 when barrier 680 is engaged. That is, when barrier 680 is engaged, the contents of reservoir 660 remain in reservoir 660. Alternatively, when barrier 680 is disengaged, the contents of reservoir 660 exit reservoir 660. Examples of barrier 680 include, but are not limited to, a plug, a cap, a flap, and the like barriers.

The invention claimed is:

1. An egg carton, comprising:
   a bottom surface;
   a plurality of depressions formed in the bottom surface, each depression comprising a size and shape for storing an egg;
   an egg-opening apparatus in the bottom surface;
   a reservoir located adjacent to the egg-opening apparatus and configured for storing contents of an egg opened via the egg-opening apparatus; and a conduit in communication with the reservoir, wherein:
- the conduit is configured for enabling the contents stored in the reservoir to flow out of the egg carton, and
- the conduit comprises a barrier for selectively allowing and preventing the contents of the reservoir from exiting the reservoir via the conduit when the barrier is engaged.

2. The egg carton of claim 1, wherein the egg-opening apparatus comprises a shape that enables cracking an egg when the egg is struck on the egg-opening apparatus.

3. The egg carton of claim 2, wherein the egg-opening apparatus is formed from a material with hardness that enables cracking an egg when the egg is struck on the egg-opening apparatus.

4. The egg carton of claim 3, wherein the egg-opening apparatus is formed from one of a plastic material, a metallic material, and a cardboard material.

5. The egg carton of claim 2, wherein the egg-opening apparatus comprises one of an edge, a ridge, and a point.

6. The egg carton of claim 5, wherein the one of the edge, the ridge, and the point comprises a dimension that discourages smashing the eggshell when the egg is struck on the egg-opening apparatus.

7. The egg carton of claim 5, further comprising a plurality of protrusions extending above a level of the bottom surface, wherein the one of the edge, the ridge, and the point comprises a height reaching above the plurality of protrusions.

8. The egg carton of claim 1, further comprising a lid, wherein the lid comprises a slot including a size sufficient to house the egg-opening apparatus when the lid is closed.

* * * * *